United States Patent
Strauss et al.

(10) Patent No.: US 9,959,412 B2
(45) Date of Patent: May 1, 2018

(54) SAMPLING CONTENT USING MACHINE LEARNING TO IDENTIFY LOW-QUALITY CONTENT

(71) Applicant: Facebook, Inc., Menlo Park, CA (US)

(72) Inventors: Emanuel Alexandre Strauss, San Mateo, CA (US); John Spencer Beecher-Deighan, San Francisco, CA (US); Daniel Olmedilla de la Calle, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 204 days.

(21) Appl. No.: 15/067,498

(22) Filed: Mar. 11, 2016

(65) Prior Publication Data
US 2017/0262635 A1    Sep. 14, 2017

(51) Int. Cl.
*G06F 17/00* (2006.01)
*G06F 21/57* (2013.01)
(Continued)

(52) U.S. Cl.
CPC ........ *G06F 21/577* (2013.01); *G06F 17/3053* (2013.01); *G06F 21/10* (2013.01);
(Continued)

(58) Field of Classification Search
CPC .... G06F 21/577; G06F 21/10; G06F 17/3053; G06F 2221/0775; G06N 99/005; G06Q 30/0269; G06Q 30/0275
(Continued)

(56) References Cited

U.S. PATENT DOCUMENTS

| 8,639,544 B1* | 1/2014 | Flemma, Jr. | ....... G06Q 30/0248 705/7.11 |
| 2014/0068696 A1* | 3/2014 | Schaad | ..................... G06F 9/54 726/1 |

(Continued)

OTHER PUBLICATIONS

Attenberg, J. et al., "Why Label When You Can Search?: Alternatives to Active Learning for Applying Human Resources to Build Classification Models Under Extreme Class Imbalance," *Proceedings of the 16th ACM SIGKDD International Conference on Knowledge Discovery and Data Mining*, ACM, 2010, pp. 423-432.
(Continued)

*Primary Examiner* — Mohammad W Reza
(74) *Attorney, Agent, or Firm* — Fenwick & West LLP

(57) ABSTRACT

An online system obtains risk scores determined by a machine learning model for a content item provided by a user of an online system for display to users of the online system, where the risk scores indicate the likelihood of content items violating a content policy. The online system uses the risk scores to determine sampling weights used to select content items for inclusion in a sampled subset of content items. The sampling weights are determined from risk score counts indicating the relative frequency of the obtained risk scores and impression counts indicating the number of times content items have been presented to the users of the online system. The online system presents the selected content items for evaluation by a human reviewer using a quality review interface. Using the results of the quality review, the online system determines quality performance metrics of the machine learning model.

19 Claims, 7 Drawing Sheets

(51) Int. Cl.
    *G06Q 30/02*     (2012.01)
    *G06F 17/30*     (2006.01)
    *G06F 21/10*     (2013.01)
    *G06N 99/00*     (2010.01)

(52) U.S. Cl.
    CPC ....... *G06N 99/005* (2013.01); *G06Q 30/0269* (2013.01); *G06Q 30/0275* (2013.01); *G06F 2221/0775* (2013.01)

(58) Field of Classification Search
    USPC .......................................................... 726/1
    See application file for complete search history.

(56) References Cited

U.S. PATENT DOCUMENTS

2014/0208340 A1*   7/2014   Poornachandran   H04N 21/44218
                                                                                                                              725/10
2015/0312431 A1*   10/2015   Hickie ................... H04N 5/772
                                                                                                                           348/231.7

OTHER PUBLICATIONS

Duffield, N. et al., "Priority Sampling for Estimation of Arbitrary Subset Sums," J. ACM, vol. 54, Dec. 2007, 39 pages.

Étoré, P. et al., "Adaptive Optimal Allocation in Stratified Sampling Methods," Methodology and Computing in Applied Probability, vol. 12, No. 3, 2010, pp. 335-360.

Fritsch, F. et al., "Monotone Piecewise Cubic Interpolation," SIAM Journal on Numerical Analysis, vol. 17, Apr. 1980, pp. 238-246.

Nadarajah, S. et al., "On the Moments of the Exponentiated Weibull Distribution," Communications in Statistics: Theory and Methods, vol. 34, Feb. 2005, pp. 253-256.

Niculescu-Mizil, A. et al., "Predicting Good Probabilities with Supervised Learning," Proceedings of the 22nd International Conference on Machine Learning, ICML '05, New York, NY, ACM, 2005, pp. 625-632.

Oh, M. et al., "Adaptive Importance Sampling in Monte Carlo Integration," Journal of Statistical Computation and Simulation, vol. 41, No. 3-4, 1992, pp. 143-168.

Owen, A., "Monte Carlo Theory, Methods and Examples," 2013, Chap. 1-2, 9, 93 pages.

Sawade, C. et al., "Active Risk Estimation," *Proceedings of the 27th International Conference on Machine Learning* (ICML-10), 2010, pp. 951-958.

Sculley, D. et al., "Detecting Adversarial Advertisements in the Wild," *Proceedings of the 17th ACM SIGKDD International Conference on Data Mining and Knowledge Discovery*, 2011, pp. 274-282.

Sculley, D. et al., "Hidden Technical Debt in Machine Learning Systems," Advances in Neural Information Processing Systems, 2015, pp. 2494-2502.

Tokdar, S. et al., "Importance Sampling: a Review," Wiley Interdisciplinary Reviews: Computational Statistics, vol. 2, No. 1, 2010, pp. 54-60.

Zadrozny, B. et al., "Obtaining Calibrated Probability Estimates from Decision Trees and Naïve Bayesian Classifiers," Proceedings of the 18th International Conference on Machine Learning, ICML '01, San Francisco, CA, Morgan Kaufmann Publishers Inc., 2001, pp. 609-616.

* cited by examiner

SAMPLING CONTENT USING MACHINE LEARNING TO IDENTIFY LOW-QUALITY CONTENT

BACKGROUND

This disclosure relates generally to online systems, and more specifically to validating performance of a machine learning classifier by efficiently identifying members of a minority class among a population with a class imbalance.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user (i.e., user-provided content) may be declarative information provided by a user, status updates, images, photographs, videos, text data, any other information a user wishes to share with other users of the online system, or a combination thereof. User-provided content may include sponsored content that a sponsoring user (e.g., an organization) requests to be presented to other users who are not necessarily connected with the sponsoring user.

To ensure a high-quality user experience, online systems may remove low-quality content having characteristics violating a content policy. Content may be deemed low-quality because it contains offensive, unintelligible, or malicious elements. Offensive elements include text, images, or videos that are suggestive, violent, sensational, or illegal. Unintelligible elements include poor grammar, illegible words, words in a language different from a user's language, or an image obscured by overlaid text. Malicious elements may collect private information, misrepresent a product or service, or deliver malware to a user's computer.

The online system maintains a review process to identify instances of low-quality content before the online system presents them to viewing users. In order to evaluate the review process, human reviewers may manually classify user-provided content accepted by the review process. For the evaluation process to produce meaningful results, the evaluated subset should include significant quantities of both acceptable-quality content and low-quality content. However, most user-provided content complies with content policies maintained by an online system, and the review process filters out most low-quality content and thus prevents it from being presented to other users. As a result, it is difficult to identify low-quality content presented to users, and evaluations of the review process use large quantities of human review time to identify instances of low-quality content presented to users.

SUMMARY

An online system evaluates user-provided content using a content review process that determines whether the user-provided content complies with content policies of the online system. The review process enables the online system to reject low-quality content that contains elements that are offensive, unintelligible, malicious, or otherwise non-compliant with content policies. The review process rejects or accepts user-provided content according to a risk score generated by a machine learning model that predicts the likelihood of the user-provided content violating a content policy. The machine learning model uses input machine learning features corresponding to characteristics of the content item and its components (e.g., text, image, video, interactive elements). User-provided content receiving a low risk score is eligible for presentation to other users of the online system, and user-provided content receiving a high risk score is rejected and returned to the submitting user for revision. The review process may include human reviewers that determine whether to accept or reject content receiving a moderate risk score.

To evaluate the effectiveness of the review process, the online system samples user-provided content accepted by the review process and presented to users of the online system. The sampled user-provided content is submitted to human reviewers who confirm whether the user-provided content complies with the content policies of the online system. The online system generates quality performance metrics indicating the proportion of low-quality content accepted by the initial review process. The quality performance metrics may be segmented according to characteristics of the identified low-quality content or the users who submitted the low-quality content.

To improve the accuracy and precision of the quality performance metrics, the online system implements a sampling process that identifies relatively more low-quality content than would be identified by random sampling, which would identify, e.g., a one-percent proportion of low-quality content. Such a low proportion of low-quality content limits the accuracy of the quality performance metrics unless a relatively large number of content items are sampled to provide a significant number of low-quality content items. Thus, the online system implements a biased sampling process to increase the proportion of low-quality content among the sampled subset of content.

To determine whether to include a content item in the sampled subset of content, the online system determines a sampling weight that determines a content item's likelihood of selection for inclusion in the sampled subset of content. The sampling weight is based on the relative frequency of a content item's risk score assigned by the machine learning model of the content review process. The online system assigns higher sampling weights to content items assigned a risk score having a relatively low frequency among user-provided content. Since content items having a relatively low frequency among the user-provided content typically have higher risk scores, such content items are more likely to be identified as low-quality content items. The sampling weight is further based on the number of impressions a content item has received in order to identify instances of low-quality content having a relatively large impact of the user experience due to a relatively large number of impressions. Thus, use of the determined sampling weights when sampling increases the proportion of low-quality content in the sampled subset, as well as the proportion of low-quality content having a high impression count and therefore a disproportionate impact on user experience.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Figure 1:
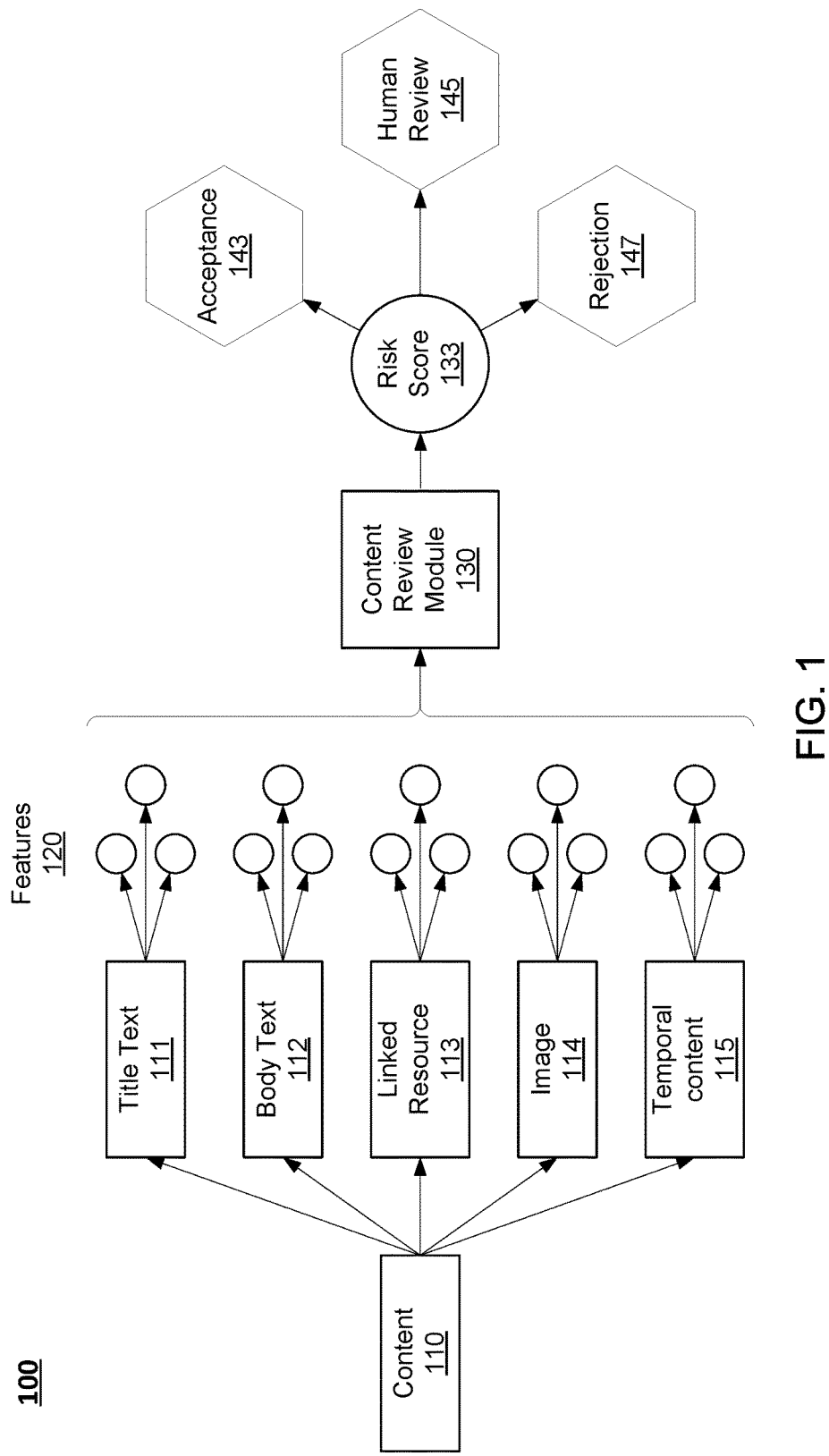
FIG. 1 is a conceptual diagram illustrating a review process for user-provided content, in accordance with an embodiment.

FIG. 1 is a conceptual diagram illustrating a review process 100 for user-provided content 110, in accordance with an embodiment. The review process 100 extracts components of content 110, such an advertisement, sponsored content, a status update, shared media, a comment, or a page post. In the illustrated example, the extracted components include title text 111, body text 112, linked resource 113, an image 114, and temporal content 115. However, content 110 may include only a subset of these components or may contain additional components.

The review process 100 extracts machine learning features 120 from the extracted components. Machine learning features 120 summarize a characteristic of an extracted component and may be binary, categorical, or numerical (e.g., a count, a probability, a normalized count). The machine learning features 120 may be outputs of machine learning models using features of the content 110 as input. For example, one or more of the machine learning features 120 are output by a machine learning algorithm indicating the probability of the content 110 containing an image 114 of the online system's logo.

The title text 111 and body text 112 may be represented by any format such as ASCII or Unicode. Generally, the title text 111 is more concise and prominent than the body text 112. Example machine learning features 120 generated from text (e.g., 111 or 112) include text length, text size, presence of unrecognized words, or presence of a particular word or phrase (e.g., "alcohol," "tobacco," "ammo," "singles," "homeopathic," "other," "you," "believe," "secret," "your life," "faith in humanity," "one weird trick"). The review process 100 may generate machine learning features 120 that are the outputs of machine learning models predicting the probability of the text 111 or 112 containing obscured words or obscured content (e.g., a lewd symbol drawn in ASCII or concealed in media). Such words may be obscured in text using deliberate misspelling (e.g., "phree"), modified spacing (e.g., "the pen is mightier"), or substitution of punctuation and numbers for characters (e.g., "m0rtgage qu0t3s").

A linked resource 113 refers to a website or other resource referenced by a link included in the content 110. Selection of a portion of the content 110 corresponding to the link causes navigation to a website internal or external to the online system or to a portion of an interface of the application presenting the online system to user. The review process 100 generates machine learning features 120 corresponding to features of the linked resource 113 and features of content extracted from the linked resource 113. Example machine learning features 120 of the linked resource 113 include an Internet traffic ranking or presence on a whitelist or blacklist of websites. The review process 100 may also generate machine learning features 120 of content (e.g., text, images, video, executable program code) extracted from the linked resource 113, such as from a landing page of a website.

An image 114 refers to a representation of visual data in a digital format such as raster graphics (e.g., bitmaps), vector graphics, or either of these in a compressed form. The review process 100 generates machine learning features 120 indicating visual properties of the image 114 (e.g., color balance, brightness) as well as presence of objects identified by an object recognition algorithm (e.g., a face, an item, an anatomical part), for example.

Temporal content 115 refers to a representation of visual or audio data that varies over time while presented. Example temporal content 115 includes a video, an animation, audio, or a combination thereof. The review process 100 generates machine learning features 120 representing visual properties, audio properties (e.g., loudness), presence of objects identified by object recognition algorithms, or presence of words or phrases identified by speech recognition algorithms, for example.

Further components of content may include executable code for content items 110 containing interactive media, media player controls, or other online system functionality (e.g., establishing a connection with a page or user of the online system). The review process 100 generates machine learning features 120 indicating presence of particular functionality (e.g., text boxes to receive information, attempts to read or write to a shared browser memory), for example.

The content review module 130 may generate further machine learning features 120 based on information associated with the user profile of the user providing the content. For example, the machine learning features are based on declarative information submitted as part of a user profile, inferred information associated with the user profile, and connections of the user profile to other user profiles in the online system. The content review module 130 may generate further machine learning features 120 based on actions of the user in the online system, such as number of content items submitted to the review process 100, number (or proportion) of content items rejected by the review process 100, time elapsed since the user joined the online system, and frequency of actions taken by the user relative to other users.

Figure 4:
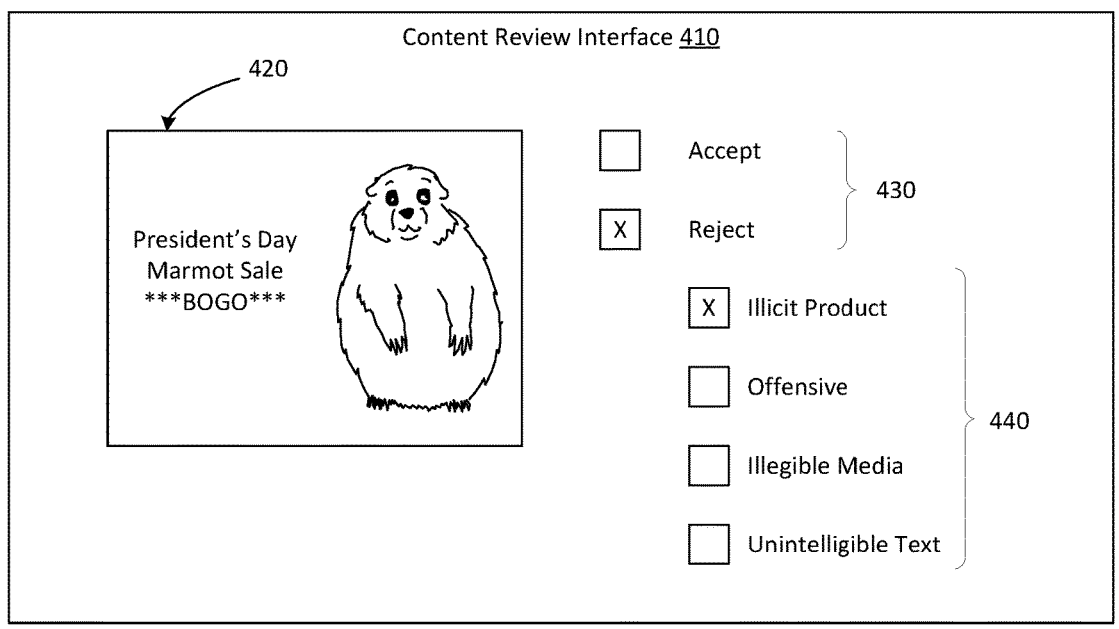
FIG. 4 is an example of a content review interface for human review of user-provided content, in accordance with an embodiment.

The content review module 130 includes an overall machine learning model that takes as input the machine learning features 120 and outputs a review decision indicating whether the content 110 is eligible for presentation (i.e., whether the content 110 complies with online system policies, whether the content is not low-quality). The content review module 130 may output review decisions including acceptance 143, human review 145, and rejection 147. In response to acceptance 143, the online system may set a quality flag associated with the content to indicate that the content 110 is eligible for presentation to other users of the online system. In response to rejection 147, the online system informs the user who provided the content and indicates one or more reasons for rejection. In response to a decision for human review 145, the online system presents the content 110 in a review interface. The review interface includes controls for a human reviewer to indicate whether the online system should accept 143 or reject 147 the content. An example of the review interface is illustrated in FIG. 4, described in more detail below.

The content review module 130 outputs a risk score 133 quantifying the likelihood of the content 110 violating a content policy. The overall machine learning model outputs the risk score 133 using the machine learning features 120 as input. The overall machine learning model may include one or more boosted decision trees, logistic regressions, neural networks, deep learning models, support vector machines, any other machine learning or classification techniques, or a combination thereof. The overall machine learning model may be trained using supervised or unsupervised learning techniques corresponding to the particular machine learning techniques included in the overall machine learning model. The content review module 130 determines a review decision for the content by comparing the risk score 133 to one or more thresholds. For example, the content review module 130 rejects 147 the content 110 if the risk score 133 equals or exceeds a rejection threshold and accepts 143 the content 110 if the risk score 133 is less than the rejection threshold. As another example, the content review module 130 rejects 147 the content 110 if the risk score 133 equals or exceeds a rejection threshold, and flags the content 110 for human review 145 if the risk score does not exceed the rejection threshold and equals or exceeds a review threshold less than the rejection threshold. In this example, the content review module 130 accepts 143 the content 110 if the risk score 133 does not exceed the review threshold or the rejection threshold.

The content review module 130 may also include one or more conditional tests that may override the review decision determined from the risk score 133. A conditional test may take as input one or more of the machine learning features 120 (which may themselves be outputs of a machine learning algorithm). The conditional test may include Boolean logic, one or more comparisons of the input features to one or more test thresholds, or a combination thereof. The content review module 130 may determine an intermediate risk score corresponding to a particular type of content policy violation and determine a review decision by combining the intermediate risk score with one or more conditional tests. For example, the content review module 130 may include an intermediate risk score corresponding to the content 110 containing references to alcohol. The content review module 130 includes conditional tests that automatically reject content 110 if (1) the intermediate risk score for alcohol is above a threshold score and (2) the content 110 is associated with targeting criteria that specify users below a threshold age (e.g., 25 years). The content review module 130 allows content 110 even if the intermediate risk score for alcohol is above the threshold score as long as the content 110 is associated with targeting criteria specifying a minimum age appropriate for countries where the content 110 may be presented.

System Architecture

Figure 2:
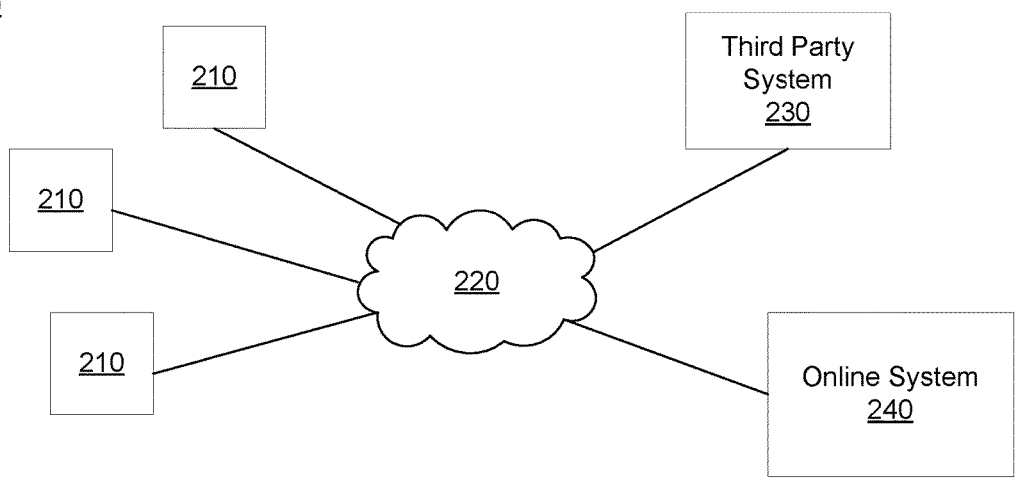
FIG. 2 is a block diagram of a system environment in which an online system operates, in accordance with an embodiment.

FIG. 2 is a block diagram of a system environment 200 for an online system 240. The system environment 200 shown by FIG. 2 comprises one or more client devices 210, a network 220, one or more third-party systems 230, and the online system 240. In alternative configurations, different and/or additional components may be included in the system environment 200. The embodiments described herein may be adapted to online systems that are social networking systems, content sharing networks, or other systems providing content to users.

The client devices 210 are one or more computing devices capable of receiving user input as well as transmitting and/or receiving data via the network 220. In one embodiment, a client device 210 is a conventional computer system, such as a desktop or a laptop computer. Alternatively, a client device 210 may be a device having computer functionality, such as a personal digital assistant (PDA), a mobile telephone, a smartphone, a smart watch or another suitable device. A client device 210 is configured to communicate via the network 220. In one embodiment, a client device 210 executes an application allowing a user of the client device 210 to interact with the online system 240. For example, a client device 210 executes a browser application, or an application designed specifically for interaction with the online system 240, to enable interaction between the client device 210 and the online system 240 via the network 220. In another embodiment, a client device 210 interacts with the online system 240 through an application programming interface (API) running on a native operating system of the client device 210, such as IOS® or ANDROID™.

The client devices 210 are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more third party systems 230 may be coupled to the network 220 for communicating with the online system 240, which is further described below in conjunction with FIG. 3. In one embodiment, a third party system 230 is an application provider communicating information describing applications for execution by a client device 210 or communicating data to client devices 210 for use by an application executing on the client device 210. In other embodiments, a third party system 230 provides content or other information for presentation via a client device 210. A third party system 230 may also communicate information to the online system 240, such as advertisements, content, or information about an application provided by the third party system 230.

In some embodiments, one or more of the third party systems 230 provide content to the online system 240 for presentation to users of the online system 240 and provide compensation to the online system 240 in exchange for presenting the content. For example, a third party system 230 provides advertisement requests, which are further described below in conjunction with FIG. 3, including advertisements for presentation and amounts of compensation provided by the third party system 230 to the online system 240 in exchange presenting the advertisements to the online system 240. Content presented by the online system 240 for which the online system 240 receives compensation in exchange for presenting is referred to herein as "sponsored content." Sponsored content from a third party system 230 may be associated with the third party system 230 or with another entity on whose behalf the third party system 230 operates.

Figure 3:
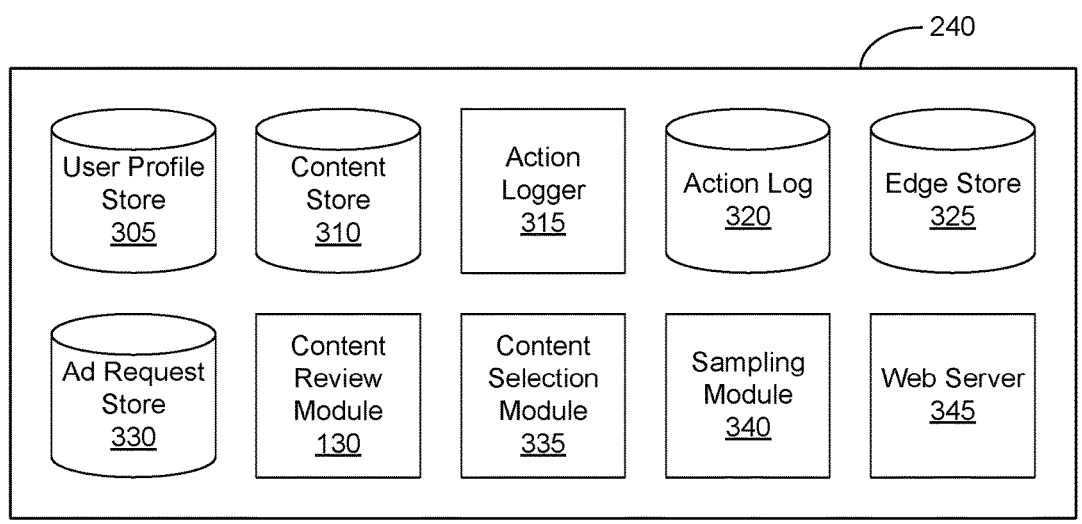
FIG. 3 is a block diagram of an online system, in accordance with an embodiment.

FIG. 3 is a block diagram of an architecture of the online system 240. The online system 240 shown in FIG. 3 includes a user profile store 305, a content store 310, an action logger 315, an action log 320, an edge store 325, an advertisement ("ad") request store 330, a content review module 130, a content selection module 335, a sampling module 340, and a web server 345. In other embodiments, the online system 240 may include additional, fewer, or different components for various applications. Conventional components such as network interfaces, security functions, load balancers, failover servers, management and network operations consoles, and the like are not shown so as to not obscure the details of the system architecture.

Each user of the online system 240 is associated with a user profile, which is stored in the user profile store 305. A user profile includes declarative information about the user that was explicitly shared by the user and may also include profile information inferred by the online system 240. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 305 may also maintain references to actions by the corresponding user performed on content items in the content store 310 and stored in the action log 320.

While user profiles in the user profile store 305 are frequently associated with individuals, allowing individuals to interact with each other via the online system 240, user profiles may also be stored for entities such as businesses or organizations. This allows an entity to establish a presence on the online system 240 for connecting and exchanging content with other online system users. The entity may post information about itself, about its products or provide other information to users of the online system 240 using a brand page associated with the entity's user profile. Other users of the online system 240 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 310 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 310, such as status updates, photos tagged by users to be associated with other objects in the online system 240, events, groups or applications. In some embodiments, objects are received from third-party applications or third-party applications separate from the online system 240. In one embodiment, objects in the content store 310 represent single pieces of content, or content "items." Hence, online system users are encouraged to communicate with each other by posting text and content items of various types of media to the online system 240 through various communication channels. This increases the amount of interaction of users with each other and increases the frequency with which users interact within the online system 240.

The action logger 315 receives communications about user actions internal to and/or external to the online system 240, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 320.

The action log 320 may be used by the online system 240 to track user actions on the online system 240, as well as actions on third party systems 230 that communicate information to the online system 240. Users may interact with various objects on the online system 240, and information describing these interactions is stored in the action log 320. Examples of interactions with objects include: commenting on posts, sharing links, checking-in to physical locations via a client device 210, accessing content items, and any other suitable interactions. Additional examples of interactions with objects on the online system 240 that are included in the action log 320 include: commenting on a photo album, communicating with a user, establishing a connection with an object, joining an event, joining a group, creating an event, authorizing an application, using an application, expressing a preference for an object ("liking" the object), engaging in a transaction, viewing an object (e.g., a content item), and sharing an object (e.g., a content item) with another user. Additionally, the action log 320 may record a user's interactions with advertisements on the online system 240 as well as with other applications operating on the online system 240. In some embodiments, data from the action log 320 is used to infer interests or preferences of a user, augmenting the interests included in the user's user profile and allowing a more complete understanding of user preferences.

The action log 320 may also store user actions taken on a third party system 230, such as an external website, and communicated to the online system 240. For example, an e-commerce website may recognize a user of an online system 240 through a social plug-in enabling the e-commerce website to identify the user of the online system 240. Because users of the online system 240 are uniquely identifiable, e-commerce websites, such as in the preceding example, may communicate information about a user's actions outside of the online system 240 to the online system 240 for association with the user. Hence, the action log 320 may record information about actions users perform on a third party system 230, including webpage viewing histories, advertisements that were engaged, purchases made, and other patterns from shopping and buying. Additionally, actions a user performs via an application associated with a third party system 230 and executing on a client device 210 may be communicated to the action logger 315 by the application for recordation and association with the user in the action log 320.

In one embodiment, the edge store 325 stores information describing connections between users and other objects on the online system 240 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 240, such as expressing interest in a page on the online system 240, sharing a link with other users of the online system 240, and commenting on posts made by other users of the online system 240.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 240, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the online system 240 over time to approximate a user's interest in an object or in another user in the online system 240 based on the actions performed by the user. A user's affinity may be computed by the online system 240 over time to approximate the user's interest in an object, in a topic, or in another user in the online system 240 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

One or more advertisement requests ("ad requests") are included in the ad request store 330. An ad request includes advertisement content, also referred to as an "advertisement," and a bid amount. The advertisement is text, image, audio, video, or any other suitable data presented to a user. In various embodiments, the advertisement also includes a landing page specifying a network address to which a user is directed when the advertisement content is accessed. The bid amount is associated with an ad request by an advertiser and is used to determine an expected value, such as monetary compensation, provided by the advertiser to the online system 240 if an advertisement in the ad request is presented to a user, if the advertisement in the ad request receives a user interaction when presented, or if any suitable condition is satisfied when the advertisement in the ad request is presented to a user. For example, the bid amount specifies a monetary amount that the online system 240 receives from the advertiser if an advertisement in an ad request is displayed. In some embodiments, the expected value to the online system 240 of presenting the advertisement may be determined by multiplying the bid amount by a probability of the advertisement being accessed by a user. The advertiser is a user of the online system 240 who sends an ad request (or other sponsored content) to the online system (e.g., using an ad interface or a sponsored content interface).

Additionally, an ad request may include one or more targeting criteria specified by the advertiser. Targeting criteria included in an ad request specify one or more characteristics of users eligible to be presented with advertisement content in the ad request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 240. Targeting criteria may also specify interactions between a user and objects performed external to the online system 240, such as on a third party system 230. For example, targeting criteria identifies users who have taken a particular action, such as sent a message to another user, used an application, joined a group, left a group, joined an event, generated an event description, purchased or reviewed a product or service using an online marketplace, requested information from a third party system 230, installed an application, or performed any other suitable action. Including actions in targeting criteria allows advertisers to further refine users eligible to be presented with advertisement content from an ad request. As another example, targeting criteria identifies users having a connection to another user or object or having a particular type of connection to another user or object.

The content review module 130 analyzes user-provided content and determines a review decision indicating whether the user-provided content may be presented to users of the online system. The user-provided content reviewed by the content review module 130 includes advertisement content from the ad request store 330 and content from the content store 310. If the content review module 130 determines to accept the content, the content is eligible for selection by the content selection module 335. If the content review module 130 determines to reject the content, the content is ineligible for selection by the content selection module 335. The content review module 130 may facilitate a human review process to determine whether to accept or reject ambiguous content that cannot be classified automatically (e.g., using a machine-learning model or classifier). For example, such ambiguous content may have a risk score between a rejection threshold and an acceptance threshold. The content review module 130 is described in further detail with respect to FIG. 1 and FIG. 4.

The content selection module 335 selects one or more content items for communication to a client device 210 to be presented to a user. Content items eligible for presentation to the user are retrieved from the content store 310, from the ad request store 330, or from another source by the content selection module 335, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 335 includes content items eligible for presentation to the user in one or more selection processes, which identify a set of content items for presentation to the user. For example, the content selection module 335 determines measures of relevance of various content items to the user based on characteristics associated with the user by the online system 240 and based on the user's affinity for different content items. Information associated with the user included in the user profile store 305, in the action log 320, and in the edge store 325 may be used to determine the measures of relevance. Based on the measures of relevance, the content selection module 335 selects content items for presentation to the user. As an additional example, the content selection module 335 selects content items having the highest measures of relevance or having at least a threshold measure of relevance for presentation to the user. Alternatively, the content selection module 335 ranks content items based on their associated measures of relevance and selects content items having the highest positions in the ranking or having at least a threshold position in the ranking for presentation to the user.

Content items selected for presentation to the user may include advertisements from ad requests or other content items associated with bid amounts. The content selection module 335 uses the bid amounts associated with ad requests when selecting content for presentation to the viewing user. In various embodiments, the content selection module 335 determines an expected value associated with various ad requests (or other content items) based on their bid amounts and selects advertisements from ad requests associated with a maximum expected value or associated with at least a threshold expected value for presentation. An expected value associated with an ad request or with a content item represents an expected amount of compensation to the online system 240 for presenting an advertisement from the ad request or for presenting the content item. For example, the expected value associated with an ad request is a product of the ad request's bid amount and a likelihood of the user interacting with the ad content from the ad request. The content selection module 335 may rank ad requests based on their associated bid amounts and select advertisements from ad requests having at least a threshold position in the ranking for presentation to the user. In some embodiments, the content selection module 335 ranks both content items not associated with bid amounts and ad requests in a unified ranking based on bid amounts associated with ad requests and measures of relevance associated with content items and with ad requests. Based on the unified ranking, the content selection module 335 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 335 receives a request to present a feed of content (also referred to as a "content feed") to a user of the online system 240. The feed may include one or more advertisements as well as content items, such as stories describing actions associated with other online system users connected to the user. The content selection module 335 accesses one or more of the user profile store 305, the content store 310, the action log 320, and the edge store 325 to retrieve information about the user and selects content items based on the retrieved information. For example, information describing actions associated with other users connected to the user or other data associated with users connected to the user is retrieved and used to select content items describing actions associated with one or more of the other users. Additionally, one or more ad requests may be retrieved from the ad request store 330. The retrieved ad requests and other content items are analyzed by the content selection module 335 to identify candidate content items that are likely to be relevant to the user. For example, content items associated with users who not connected to the user or content items associated with users for whom the user has less than a threshold affinity are discarded as candidate content items. Based on various criteria, the content selection module 335 selects one or more of the candidate content items or ad requests identified as candidate content items for presentation to the user. The selected content items or advertisements from selected ad requests are included in a feed of content that is presented to the user. For example, the feed of content includes at least a threshold number of content items describing actions associated with users connected to the user via the online system 240.

In various embodiments, the content selection module 335 presents content to a user through a feed including a plurality of content items selected for presentation to the user. One or more advertisements may also be included in the feed. The content selection module 335 may also determine an order in which selected content items or advertisements are presented via the feed. For example, the content selection module 335 orders content items or advertisements in the feed based on likelihoods of the user interacting with various content items or advertisements.

The sampling module 340 evaluates the effectiveness of the content review module 130. The sampling module 340 takes as input content selected for presentation to users by the content selection module 335. The sampling module 340 selects content from the input content using a sampling method based on the risk score determined by the content review module 130. The sampling method may be biased to select content having more impressions in the online system at a higher frequency than content with fewer impressions. The sampling module 340 provides the sampled content for human review 145 through a review interface presented by a client device 210. The sampling module 340 uses low-quality content identified through the review interface to evaluate and improve the effectiveness of the content review module 130.

To evaluate effectiveness of the review process, the sampling module 340 determines whether the result of human review (e.g., acceptance or rejection) matches the result of the content review module 130 (that is, whether the "ground truth" of human review matches the predictions of the content review module 130). Performance indicators of the review process may be determined from the rate of agreement between the initial decision of the content review module 130 and the result of human review 145. Additionally, instances of content accepted by the content review module 130 but rejected by human review 145 may be used to improve the review process. Such content may be used as training data to improve machine learning models included in the content review module 130 or used to generate the machine learning features 120. The sampling module may determine characteristics of low-quality content accepted by the review process by segmenting the low-quality content identified through the sampling process. For example, the low-quality content is segmented by the country of the client device 210 providing the content in order to determine countries to receive more scrutiny (i.e., a lower rejection threshold) by the content review module 130.

The web server 345 links the online system 240 via the network 220 to the one or more client devices 210, as well as to the one or more third party systems 230. The web server 345 serves web pages, as well as other content, such as JAVA®, FLASH®, XML and so forth. The web server 345 may receive and route messages between the online system 240 and the client device 210, for example, instant messages, queued messages (e.g., email), text messages, short message service (SMS) messages, or messages sent using any other suitable messaging technique. A user may send a request to the web server 345 to upload information (e.g., images or videos) that are stored in the content store 310. Additionally, the web server 345 may provide application programming interface (API) functionality to send data directly to native client device operating systems, such as IOS®, ANDROID™, WEBOS® or BlackberryOS.

Content Review Interface

FIG. 4 is an example of a content review interface 410 for human review of user-provided content, in accordance with an embodiment. The content review interface 410 presents the user-provided content 420, typically through a client device 210 accessed by a user of the online system 240 who has been granted review privileges. The online system 240 may send the content 420 for presentation in the content review interface 410 for reasons including one or more of the following: (1) the content review module 130 outputting a decision for human review; (2) selection by the sampling module 340, as described in further detail with respect to FIG. 5; or (3) feedback from another user flagging the content 420 as inappropriate or otherwise violating a content policy of the online system 240.

The content review interface 410 includes controls 430 for the reviewing user to provide a review decision. In the example of FIG. 4, the controls 430 allow the reviewing user to accept or reject the content 420. In another implementation, the controls 430 include further options, such as requesting supplemental review by another reviewing user. In response to selecting a control 430 to reject the content, the content review interface 410 may prompt the reviewing user to select one or more reasons 440 for rejection. The reasons 440 may be displayed as a finite number of options (e.g., using tick boxes or drop-down menus), a search interface to select from a catalog of reasons 440, a textbox for explaining one or more reasons 440, other interface elements, or a combination thereof.

Selecting Content for Quality Review

Figure 5:
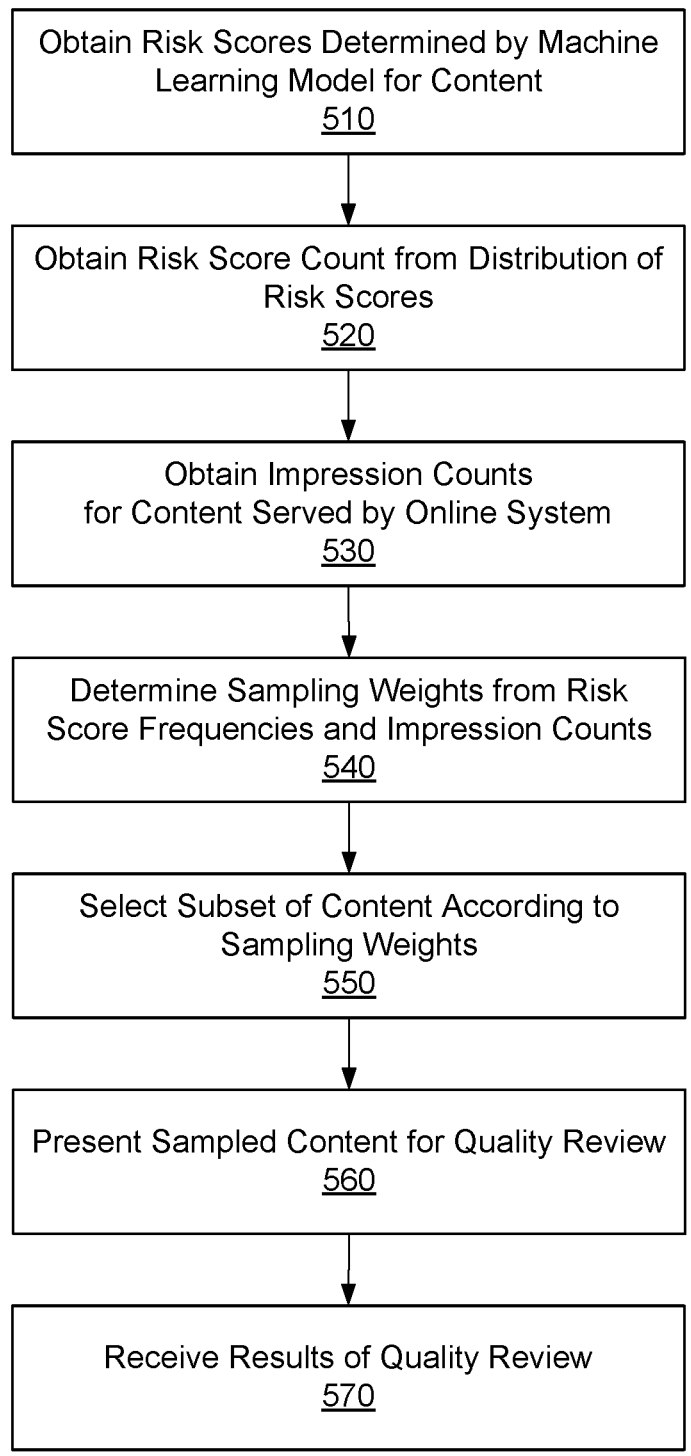
FIG. 5 is a flowchart of a method for selecting content for a quality review according to results of a machine learning model, in accordance with an embodiment.

FIG. 5 is a flowchart of a method for selecting content for a quality review according to results of a machine learning model, in accordance with an embodiment. In other embodiments, the method may include different and/or additional steps than those shown in FIG. 5. Additionally, steps of the method may be performed in different orders than the order described in conjunction with FIG. 5 in various embodiments. In some embodiments, the functionality described by FIG. 5 is performed by a combination of the sampling module 340 (e.g., steps 510, 520, 530, 540, 550) and the content review module 130 (e.g. steps 560 and 570).

The online system 240 obtains 510 risk scores determined by a machine learning model for content. The machine learning model takes as input machine learning features corresponding to characteristics of a content item and outputs a risk score for the content item. The machine learning features may correspond to the user who submitted the content item, to the content item as whole, to components extracted from the content item, or any combination thereof. The machine learning features may have binary values, categorical values, probabilistic values, or numerical values, for example, and may be derived from the content item using machine learning classifiers indicating whether the content item has particular characteristics. Example machine learning features and machine learning models to output the risk score are described further with respect to FIG. 1.

The online system 240 obtains 520 a risk score count from a distribution of the risk scores. The distribution of risk scores indicates a number (or fraction) of content items having a risk score equal to a risk score, or within a threshold range of the risk score. The online system 240 may determine the distribution by sorting the risk scores by numerical value and counting the number of content items having the same risk score for each risk score value. The risk scores may be rounded (e.g., to the nearest integer, to the nearest hundredth, to the nearest thousandth) prior to sorting and counting. Alternatively or additionally to rounding the risk scores, the online system 240 may sort the content items based on bins (i.e., numerical ranges) of risk scores and count the number of content items having risk scores within the numerical range defining each bin. For example, the bins correspond to integer values or percentiles of the risk scores. From the distribution of risk scores, the online system 240 obtains 520 a risk score count of the number of content items having the same risk score as the content item. For example, the risk score count is the number of content items in the same bin as the content item or the number of content items having a risk score within a threshold range of the contents item's risk score.

Obtaining 520 a risk score count may include the online system 240 obtaining a probability density of the risk score distribution at the particular risk score. For example, the probability density indicates a percentage or fraction of content items in the distribution that have the same risk score as the content item or that have a risk score within a threshold of the content item's risk score. The online system 240 may determine the probability density for a content item's risk score by evaluating a probability density interpolation at the risk score. As part of obtaining 520 the probability density interpolation, the online system 240 may determine a cumulative distribution of risk scores, which indicates a number (or fraction) of content items having a risk score less than or equal to a particular risk score. The online system 240 fits a cumulative distribution interpolation to the cumulative distribution and determines the probability density interpolation function from the derivative of the cumulative distribution interpolation. Estimating the probability density in this manner is described in further detail with respect to FIGS. 9 and 10.

The online system 240 obtains 530 impression counts indicating the number of times the content item has been presented to users of the online system. For example, the impression count indicates the number of times the content item has been sent to a client device 210 and presented through an output device (e.g., a display device, an audio speaker). The impression count may include only instances where at least a threshold proportion of the content item has been presented to a user. For example, the threshold proportion is a threshold percentage of the display area of a screen or other display device. The impression count may include only instances where the content item has been presented for at least a threshold amount of time, regardless of whether the content item varies with time (e.g., a video) or does not vary with time (e.g., an image). The impression count may include only instances where an input (e.g., a mouse cursor, a gesture detected on a touchscreen, the user's gaze) has been detected within a threshold distance of a boundary of the content item on the client device's display. The application on client device 210 presenting the content item may report when an impression has occurred to the online system 240, which stores the impression, e.g., in the action log 320. Alternatively or additionally, the online system 240 records an impression count in response to sending the content item to the client device 210.

The online system 240 determines 540 sampling weights for the content items based on the content item's risk score count, impression count, or both. The online system 240 determines 540 the sampling weight such that the sampling weight increases as the impression count increases. For example, the sampling weight is directly proportional to the impression count. The impact of a low-quality content item in the online system 240 on the user's experience corresponds to the number of impressions (and hence number of low-quality user experiences). As a result, determining the sampling weight to increase with the impression count beneficially improves how well the sampled content items correspond to low-quality experiences in the online system 240. Biasing low-quality content with high numbers of impressions for inclusion in the sampled subset of content items improves efforts to understand characteristics of low-quality content and improves the value of the sampled low-quality content for use in training the machine learning model of the content review module 130.

The online system 240 further determines 540 the sampling weight so that the weight increases as the risk score count decreases. For example, in some embodiments the sampling weight is inversely proportional to the risk score count. Equivalently, the sampling weight is inversely proportional to the probability density of the risk score distribution at the risk score, or in other words, to the relative amount of content items having the same risk score as the content item. Randomly sampling content items results in over-representation of content items having common risk scores. Generally, there are more content items with low risk scores than high risk scores, so randomly sampling content items results in over-representation of content items having low risk scores. By determining the sampling weight to decrease as the risk score count increases, the online system 240 counteracts the bias toward content items having more common risk scores. As a result, the sampled subset of content items includes an approximately uniform distribution of risk scores for content items, as illustrated further with respect to FIGS. 6-8.

The online system 240 may further determine 540 the sampling weight based on a goal risk score distribution. For example, the sampling weight is proportional to a goal risk score density, which is the probability density of the goal risk score distribution evaluated at the content item's risk score. If the goal risk score distribution is a uniform distribution, then the goal risk score density is uniform regardless of the risk score. In other words, determining the sampling weight without the goal risk score results in a uniform distribution of risk scores in the sampled subset. Non-trivial goal risk score distributions may be used to further bias the sampled subset of content. To increase the proportion of low-quality content in the sampled subset, the online system 240 uses a goal risk score distribution that increases with risk score. Another goal risk score distribution increases the proportion of false-negative content in the sampled subset. False negative content refers to content that does not comply with the online system's content policies but is nonetheless accepted by the review process. An example goal risk score distribution to increase false negative content in the sampled subset is a goal risk score distribution that decreases with risk score.

The online system 240 selects 550 a subset of content items according to the sampling weights. A content item's probability of being selected 550 for inclusion in the subset increases with the sampling weight determined for the content item. For example, the probability of the content item being selected 550 for inclusion in the subset is proportional to the sampling weight. Content items may be selected 550 for inclusion in the sampled subset with or without replacement. The number of content items selected 550 for inclusion in the sampled subset depends on the amount of time allocated for human reviewers to evaluate the sampled subset of content items, or the use of the sampled review data. For example, to determine quality performance metrics, the number of content items selected 550 may depend on a target amount of uncertainty in the quality performance metrics. The amount of uncertainty in a quality performance metric decreases as the number of sampled content items increases.

In response to the online system 240 selecting 550 a content item for inclusion in the sampled subset, the online system 240 presents 560 the sampled content for quality review by a human reviewer and receives 570 the results of the quality review from the human reviewer. For example, the online system 240 sends the sampled content item to a client device 210, which presents 560 the content item in a quality review interface, such as that described with respect to FIG. 4. The client device 210 sends the online system 240 the review decision selected by the human reviewer through the quality review interface. The online system 240 may present 560 the same content item for multiple reviewers to improve accuracy. For example, the online system 240 presents 560 the content item to a minimum number of initial reviewers and presents 560 the content item to further reviewers if the initial reviewers disagree, until consensus is reached.

The online system 240 uses the result of the quality review to determine whether the content item is eligible for presentation to other users of the online system 240. The online system 240 may further determine a quality performance metric based on review decisions received through the quality review interface for the sampled subset of content items. For example, the quality performance metric may indicate an estimated number of impressions of low-quality content items presented by the online system 240 or a proportion of impressions of low-quality content presented by the online system 240. As another example, the quality performance metric may indicate a false-positive rate (i.e., proportion of rejected content that complies with content policies) or a false-negative rate (i.e., proportion of accepted content that does not comply with content policies). As a third example, the quality performance metric may indicate the false-positive or false-negative rate for content that received human review or for content that did not receive human review due to automatic rejection or acceptance.

The online system 240 may determine a segmented quality performance metric for content grouped according to a common characteristic. For example, the online system 240 obtains characteristics of users or client devices 210 providing the sampled subset of content to the online system and identifies a group of content items included in the sampled subset of content and provided by users having a matching characteristic. The online system 240 determines a segmented quality performance metric for the identified group of content items. For example, the matching characteristic is the country or region of the client device 210 used to submit the content item, and the online system 240 determines segmented quality performance metrics indicating the relative risk of client devices 210 in different countries or regions submitting low-quality content. As another example, the matching characteristic is having a risk score (determined by the content review module 130) within a particular range.

The online system 240 may use the sampled subset of content items to improve the machine learning model used in the quality review process. For example, the online system 240 identifies rejected content items from the sampled subset that received a rejection review decision from the quality review interface and modifies parameters of the machine learning model by using the identified rejected content items as training inputs to the machine learning model. The identified rejected content items may be given increased weight in the training process relative to low-quality content items identified without human review.

Risk Score Distributions in Sampled Content

Figure 6:
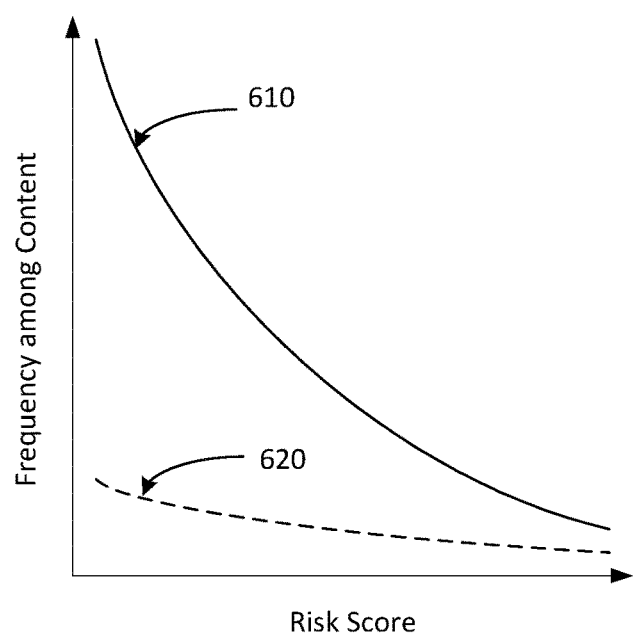
FIG. 6 is a conceptual diagram illustrating a distribution of risk scores among a population of content and a distribution of risk scores among low-quality content in the population, in accordance with an embodiment.

FIG. 6 is a conceptual diagram illustrating a distribution 610 of risk scores among a population of content and a distribution 620 of risk scores among low-quality content in the population, in accordance with an embodiment. The online system 240 provides more content assigned low risk scores than content having high risk scores, as determined by the content review module 130, so the probability density of risk scores decreases as risk scores increase. The proportion of low-quality content increases as the risk score increases, but there is still relatively more low-quality content at low risk scores than at high scores in the example distribution 620. Sampling the content randomly would result in a sampled subset having the same relative frequency (i.e., probability density) of risk scores as the initial population of content that the online system 240 presents to users. Using such a randomly sampled subset would result in a relatively low proportion of low-quality content among the sampled subset, so significant human review time would be wasted to identify the low-quality content. Additionally, a low proportion of low-quality content leads to reviewer fatigue, which decreases accuracy of review decisions and may cause erroneous acceptance decisions of low-quality content.

Figure 7:
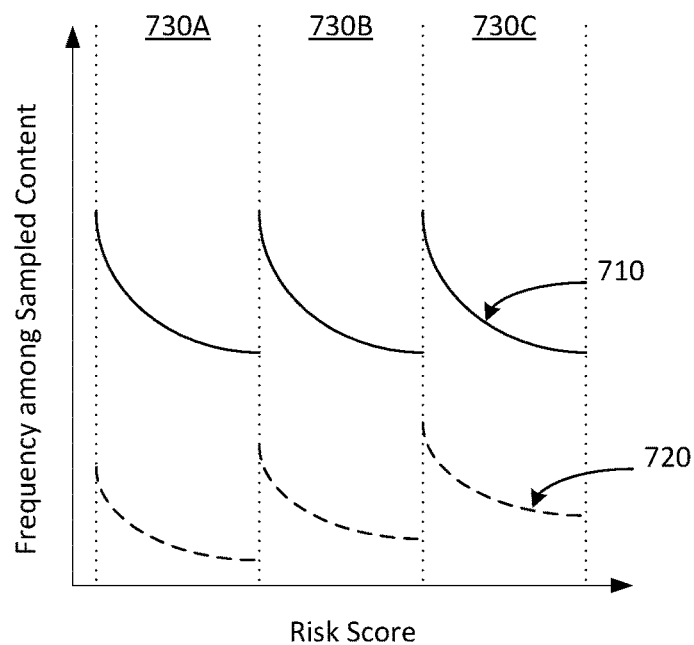
FIG. 7 is a conceptual diagram illustrating a distribution of risk scores among content selected using stratified sampling and a distribution of risk scores among low-quality content within the sample, in accordance with an embodiment.

FIG. 7 is a conceptual diagram illustrating a distribution 710 of risk scores among content selected using stratified sampling and a distribution 720 of risk scores among low-quality content within the sample, in accordance with an embodiment. In stratified sampling, content is sorted into bins (e.g., 730A, 730B, and 730C) defined by numerical ranges of risk scores. Content is selected from the bins 730 in equal proportions, in proportions corresponding to each bin's encompassed numerical range, or in proportions corresponding to the number of content items in each bin 730, for example. The distribution 710 of content in the sampled subset is skewed toward the most common risk scores in each bin 730. Since the probability density of risk scores decreases as risk scores increase in the example population of content, the relative frequency of risk scores in the sampled subset decreases within each bin 730 as the risk scores increase within the bin 730.

Stratified sampling beneficially increases the proportion of low-quality content in the sampled subset. For example, stratified sampling increased the proportion of low-quality content in the sampled subset by a factor of five compared to random sampling for a test set of sponsored content. However, stratified sampling may result in inaccurate estimates of the distribution of low-quality content in the original population, particularly in cases where the risk score distribution of low-quality content has a qualitatively different shape from the overall risk score distribution of content. For example, stratified sampling may lead to inaccurate population estimates when the risk score distribution of low-quality content has a local maximum within the risk score range defining a bin 730 or when the risk score distribution of content is monotonically decreasing over the risk score range. In this particular example, the resulting sample will inaccurately estimate the proportion of low-quality content having a risk score greater than a risk score slightly below the risk score corresponding to the local maximum.

Figure 8:
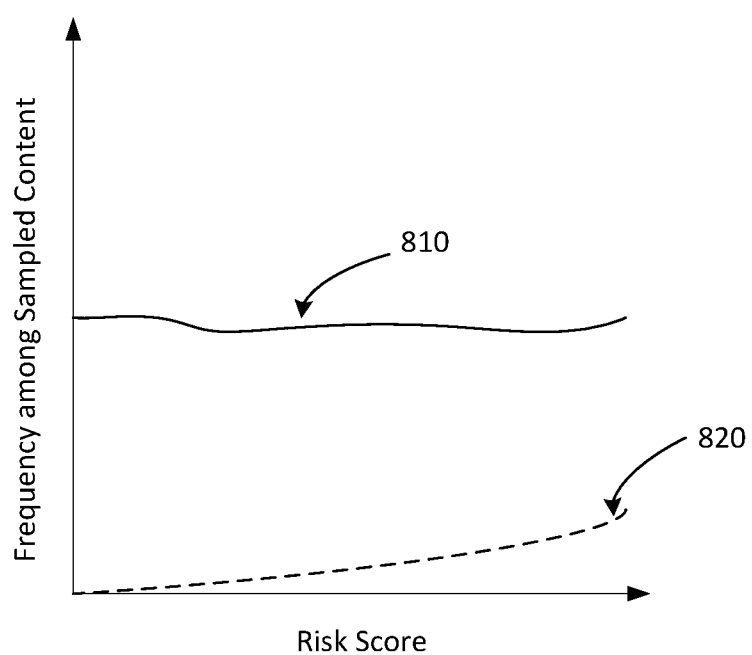
FIG. 8 is a conceptual diagram illustrating a distribution of risk scores among content sampled according to machine learning results and a distribution of risk scores among low-quality content within the sample, in accordance with an embodiment.

FIG. 8 is a conceptual diagram illustrating a distribution 810 of risk scores among content sampled according to machine learning results and a distribution 820 of risk scores among low-quality content within the sample, in accordance with an embodiment. The distribution 810 of risk scores among the content sampled according to the method described with respect to FIG. 5 is approximately uniform, subject to sampling variance. In distribution 820, the relative frequency of low-quality content increases as risk score increases, leading to a relatively high proportion of low-quality content within the sampled subset. For example, using sampling weights as described with respect to FIG. 5 increased the proportion of low-quality content in the sampled subset by a factor of six to fifteen relative to random sampling and by approximately twenty percent relative to stratified sampling for a test set of sponsored content. Additionally, in comparison to stratified sampling, the disclosed sampling method beneficially eliminates edge effects in estimating the original distribution that result from the risk score thresholds used to define the bins 730. As a result, the disclosed sampling method improves the precision of estimates of the original distribution of risk scores among the content.

By increasing the proportion of low-quality content in the sampled subset, the disclosed sampling method beneficially improves the functioning of the content review system in several ways. First, the online system 240 may generate quality performance metrics with less human review time because human reviewers spend relatively less time reviewing high-quality ads, which are relatively plentiful in the sampled subset, and relatively more time reviewing low-quality ads. The number of low-quality ads in the sampled subset determines the total number of ads to be judged by human reviewers because the low-quality ads are the minority class of the population of content items. Presenting more low-quality ads to human reviewers reduces review fatigue and accordingly improves the accuracy of the review process. Thus, the disclosed sampling technique is human-labor saving technology that improves the content review interface.

Second, the online system 240 may use the identified low-quality content to improve the accuracy of risk scores output by the machine learning model in the content review module 130. To do so, the online system 240 includes the identified instances of low-quality content as training data, which may receive more weighting than other instance of low-quality content identified by users or through the machine learning model automatically. By increasing the proportion of low-quality content identified by human reviewers, the disclosed sampling method improves the functioning of the machine learning model in automatically discriminating between low-quality content and other content that complies with content policies of the online system 240.

Estimation of Probability Density

Figure 9:
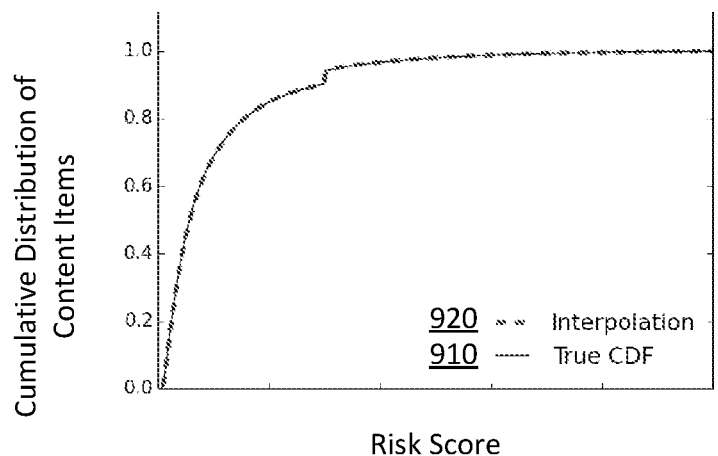
FIG. 9 is a conceptual diagram illustrating a cumulative distribution of a content population by risk score, in accordance with an embodiment.
Figure 10:
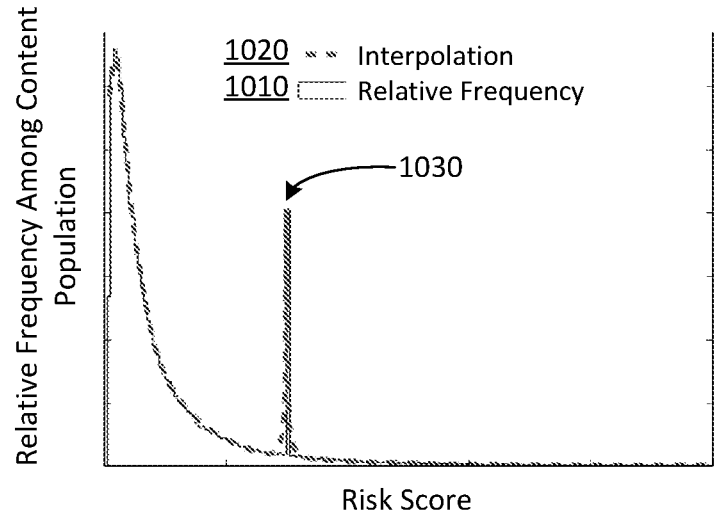
FIG. 10 is a conceptual diagram illustrating a distribution of a content population by risk score, in accordance with an embodiment.

FIG. 9 is a conceptual diagram illustrating a cumulative distribution 910 of a content population by risk score, in accordance with an embodiment. FIG. 10 is a conceptual diagram illustrating a distribution 1010 of a content population by risk score, in accordance with an embodiment. The distributions 910 and 1010 are examples corresponding to test sets of user-provided content.

The online system 240 may determine the risk score count (i.e., relative frequency) of a risk score from a probability density function 1020 by evaluating a probability density interpolation of the risk score distribution 1010. Some risk score distributions include irregular features such as the spike 1030 in risk score count. These features complicate interpolating a probability density function 1020 directly from the risk score distribution.

Instead, the online system 240 determines the cumulative distribution 910 of risk scores by determining a number (or fraction) of content items having a risk score less than or equal to a particular risk score. The online system 240 determines a cumulative distribution interpolation 920 from a data fit of the cumulative distribution. For example, the online system 240 determines the cumulative distribution interpolation 920 using a cubic spline of the cumulative distribution 910. The online system 240 determines the probability density interpolation 1020 from the derivative of the cumulative distribution interpolation 1020. The resulting probability density interpolation 1020 more accurately models the spike 1030 than a direct interpolation of the distribution 1010 of risk scores.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
obtaining a risk score determined by a machine learning model for a content item provided by a user of an online system for display to users of the online system, the risk score indicating a likelihood of the content item violating a content policy of the online system;
obtaining a risk score count of content items provided by the users of the online system and having a same risk score as the risk score of the content item;
obtaining an impression count of the content item indicating a number of times the content item has been presented to the users of the online system;
determining a sampling weight for the content item based on the risk score count and the impression count of the content item;
determining whether to select the content item for inclusion in a sampled subset of content items based on the sampling weight;
responsive to determining to select the content item for inclusion in the sampled subset of content items:
sending the content item to a client device for presentation in a quality review interface; and
receiving, from the client device, a review decision selected through the quality review interface.

2. The method of claim 1, wherein the determined sampling weight increases in response to an increase in the obtained impression count.

3. The method of claim 1, wherein the determined sampling weight increases in response to a decrease in the obtained risk score count.

4. The method of claim 3, wherein determining the sampling weight comprises determining the sampling weight inversely proportional to the obtained risk score count and directly proportional to a goal risk score density of the obtained risk score in the sampled subset of content items, the goal risk score density indicating a targeted relative frequency of the risk score in the sampled subset of content.

5. The method of claim 1, wherein obtaining the risk score count comprises:
   determining a cumulative distribution of risk scores determined by the machine learning model for content items provided by the users of the online system;
   generating a cumulative risk score interpolation of the cumulative distribution of risk scores;
   generating a risk score density interpolation from a derivative of the cumulative risk score interpolation; and
   determining the risk score count from the risk score density interpolation evaluated at the risk score of the content item.

6. The method of claim 1, wherein the quality review interface presents the content item to a human reviewer and obtains the review decision from the human reviewer, the review decision indicating whether the content item violates the content policy of the online system.

7. The method of claim 1, further comprising determining a quality performance metric based on review decisions received through the quality review interface for the sampled subset of content items.

8. The method of claim 7, further comprising:
   obtaining characteristics of users providing the sampled subset of content to the online system;
   identifying a first group of content items included in the sampled subset of content and having a first matching characteristic;
   identifying a second group of content items included in the sampled subset of content and having a second matching characteristic; and
   determining first and second segmented quality performance metrics for the identified first and second groups of content items.

9. The method of claim 1, further comprising:
   identifying rejected content items from the sampled subset that received a rejection review decision from the quality review interface; and
   modifying parameters of the machine learning model by using the identified rejected content items as training inputs to the machine learning model.

10. A method comprising:
    obtaining a risk score determined for a content item provided by a user of an online system for display to users of the online system, the risk score indicating a likelihood of the content item violating a content policy of the online system;
    obtaining a probability density value indicating a relative frequency of the risk score among risk scores of content items provided by the users of the online system;
    obtaining an impression count of the content item indicating a number of times the content item has been presented to the users of the online system;
    determining a sampling weight for the content item based on the probability density value and the impression count of the content item;
    determining whether to select the content item for inclusion in a sampled subset of content items based on the sampling weight; and
    responsive to determining to select the content item for inclusion in the sampled subset of content items, sending the content item to a client device for presentation in a quality review interface.

11. The method of claim 10, wherein the determined sampling weight is proportional to the obtained impression count.

12. The method of claim 10, wherein the determined sampling weight is inversely proportional to the obtained probability density value.

13. The method of claim 12, wherein determining the sampling weight comprises determining the sampling weight directly proportional to a goal risk score density of the obtained risk score in the sampled subset of content items, the goal risk score density indicating a targeted relative frequency of the risk score in the sampled subset of content.

14. The method of claim 10, wherein obtaining the risk score count comprises:
    determining a cumulative distribution of risk scores determined by the machine learning model for content items provided by the users of the online system;
    generating a cumulative risk score interpolation of the cumulative distribution of risk scores;
    generating a risk score density interpolation from a derivative of the cumulative risk score interpolation; and
    determining the risk score count from the risk score density interpolation evaluated at the risk score of the content item.

15. The method of claim 10, wherein the quality review interface presents the content item to a human reviewer and obtains a review decision from the human reviewer, the review decision indicating whether the content item violates the content policy of the online system.

16. A computer program product comprising a non-transitory computer readable storage medium having instructions encoded thereon that, when executed by a processor, cause the processor to:
    obtain a risk score determined for a content item provided by a user of an online system for display to users of the online system, the risk score indicating a likelihood of the content item violating a content policy of the online system;
    obtain a probability density value indicating a relative frequency of the risk score among risk scores of content items provided by the users of the online system;
    obtain an impression count of the content item indicating a number of times the content item has been presented to the users of the online system;
    determine a sampling weight for the content item based on the probability density value and the impression count of the content item, wherein the determined sampling weight is inversely proportional to the obtained probability density value;
    determine whether to select the content item for inclusion in a sampled subset of content items based on the sampling weight;

responsive to determining to select the content item for inclusion in the sampled subset of content items, send the content item to a client device for presentation in a quality review interface.

17. The computer program product of claim 16 wherein the determined sampling weight is proportional to the obtained impression count.

18. The computer program product of claim 16, wherein obtaining the risk score count comprises:
   determining a cumulative distribution of risk scores determined by the machine learning model for content items provided by the users of the online system;
   generating a cumulative risk score interpolation of the cumulative distribution of risk scores;
   generating a risk score density interpolation from a derivative of the cumulative risk score interpolation; and
   determining the risk score count from the risk score density interpolation evaluated at the risk score of the content item.

19. The computer program product of claim 16, wherein the quality review interface presents the content item to a human reviewer and obtains a review decision from the human reviewer, the review decision indicating whether the content item violates the content policy of the online system.

* * * * *

UNITED STATES PATENT AND TRADEMARK OFFICE
CERTIFICATE OF CORRECTION

PATENT NO. : 9,959,412 B2
APPLICATION NO. : 15/067498
DATED : May 1, 2018
INVENTOR(S) : Emanuel Alexandre Strauss et al.

It is certified that error appears in the above-identified patent and that said Letters Patent is hereby corrected as shown below:

In the Claims

Column 21, Line 14, after "content" insert -- items --.
Column 21, Line 38, after "content" insert -- items --.
Column 21, Line 41, after "content" insert -- items --.
Column 21, Line 44, after "content" insert -- items --.
Column 22, Line 28, after "by" delete "the" and insert -- a --.
Column 23, Line 11, after "by" delete "the" and insert -- a --.

Signed and Sealed this
Eighteenth Day of December, 2018

Andrei Iancu
*Director of the United States Patent and Trademark Office*